(12) United States Patent
Newman (10) Patent No.: US 9,179,011 B1
(45) Date of Patent: *Nov. 3, 2015

(54) TELEPHONE COMMUNICATION SYSTEM AND METHOD OF USING

(71) Applicant: Paul Newman, Eau Claire, WI (US)

(72) Inventor: Paul Newman, Eau Claire, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/727,176

(22) Filed: Jun. 1, 2015

Related U.S. Application Data

(63) Continuation-in-part of application No. 12/145,316, filed on Jun. 24, 2008, now Pat. No. 9,049,275.

(51) Int. Cl.
*H04M 3/42* (2006.01)
*H04M 19/08* (2006.01)
*H04M 3/54* (2006.01)
*H04M 9/00* (2006.01)
*H04M 1/03* (2006.01)

(52) U.S. Cl.
CPC ............ *H04M 19/08* (2013.01); *H04M 1/03* (2013.01); *H04M 3/54* (2013.01); *H04M 9/001* (2013.01)

(58) Field of Classification Search
CPC .......... H04Q 2213/13103; H04Q 2213/13141; H04M 3/436; H04M 3/42; H04M 9/001; H04M 9/002; H04M 1/70; H04M 1/723; H04M 3/465; H04M 3/54; H04M 3/46
USPC ................ 379/201.01, 258, 211.04, 168, 184
See application file for complete search history.

*Primary Examiner* — Rasha Al Aubaidi
(74) *Attorney, Agent, or Firm* — Anthony J. Bourget (57) ABSTRACT

A telephone communication system has at least two telephones and each telephone may be placed in activated mode or in the alternative, stand-by mode such that in stand-by mode a phone is incapable of making or receiving a call until or unless switched to active mode. The system includes a switch configured to activate one of the telephone to be an active mode telephone such that all remaining telephones are on standby mode prior to making an outgoing call or taking an incoming call. The system is configured such that a standby telephone may be switched to active mode during a telephone call on-the-fly.

29 Claims, 6 Drawing Sheets

TELEPHONE COMMUNICATION SYSTEM AND METHOD OF USING

CROSS-REFERENCE TO RELATED APPLICATIONS

The present application is a continuation-in-part of, and claims priority to, U.S. patent application Ser. No. 12/145,316, filed Jun. 24, 2008, approved as U.S. Pat. No. 9,049,275 to issue on Jun. 2, 2015, which is hereby incorporated by reference as if fully reproduced herein.

BACKGROUND OF THE INVENTION

1. Field of the Invention

The present invention relates generally to a telephone communication system and method of use, and more specifically to a system and method of use where telephone calls may be received by or made from various telephone within the system.

2. Background Information

With improving technological advances in the electronic location devices art, people are expected to be reachable at any location and at any time. For this purpose it is known for people to have many means of communications, such as a home telephone, a personal wireless telephone, a pager, a work wireless telephone, an office telephone, a computer, a car telephone, etc.

When a person or family or business or group of people have one or all of these methods of communication, it is increasingly difficult to know how to best reach the intended person, family or group. One known option for locating one of these persons, families or groups is by call forwarding. Call forwarding may work in two separate manners. In the first type of call forwarding incoming calls to an original phone number are forwarded to a phone associated with a second number. The phone associated with the second number rings as if the call were to the second number. The phone associated with the original number will beep once indicating to a user that the calls to that number are being forwarded to another number. Calls may be made from the phone associated with the original number, but call may not be received at that phone.

The second type of call forwarding works by having a telephone system that allows a user to enter other numbers to which a call is forwarded if the user knows they will not be at or be able to pick up a specific phone. Although convenient for locating someone, this type of call forwarding may result in the caller staying on the line for a long period of time, requires each phone to have call forwarding capabilities, only allows a message to be left with the telephone of the final calling number the call is forwarded to and requires each telephone or communication device to have a separate and distinct 10-digit calling number.

U.S. Pat. No. 7,274,782 to Forte attempts to solve some of the complications of call forwarding noted above. Forte provides a system for establishing communication with a plurality of telephone devices, having multiple telephone numbers, after a caller has called a central telephone number. This system is advantageous over call forwarding because it allows for users to pick up the incoming call at any telephone that has a calling number associated with the central calling number. Further, Forte's system allows for outgoing calls to be made from one of the telephone devices that have a calling number associated with the central number in order to decrease long distance costs if the user is traveling outside of a local calling area.

However, both call forwarding and Forte's system require each telephone device to have a separate telephone number. The number of telephone numbers has increased substantially in recent years as more types of communication devices are made available. This creates at least two problems. First, the increase of calling numbers results in one person having to commit many different 10-digit calling numbers to memory in order to either quickly provide others with their numbers or in order to be able to quickly contact other people. Second, with an increasing amount of numbers being used and associated with each new communication device, and no end in sight for the distribution of calling numbers, it is a real problem that the community will use all available 10-digit numbers.

Further, it is known to have a single number assigned to multiple telephone devices. In European Patent Application, EP 1,146,764 A2 to Duerk, Duerk discloses multiple wireless units with the same telephone number. In Duerk, only one telephone number is assigned to multiple wireless units having separate Electronic Serial Numbers (ESNs), which reduces the number of telephone numbers and allows for multiple users to answer an incoming call or join an outgoing call. In addition to the system of Duerk, it is known for large businesses to have internal systems that involve using a landline device and a mobile device in conjunction with one another while having one and only one calling number for the two devices. While the prior art has provided examples of improved systems for locating a person, family or group, there is always room for further improvement.

SUMMARY OF THE INVENTION

The known systems for locating an individual or group do provide for privacy on a communication line. However, the known systems for reducing the number of telephone numbers do not provide for privacy on the line. People have not viewed this as a problem but, rather, a fact of life. The present inventor, however, has recognized that it is possible to improve the chances of locating an individual or group, while reducing the number of calling numbers in use and allowing for user maneuverability between telephone devices at any time before, during or after a call; while maintaining complete privacy of any call.

In one aspect the invention includes a system where there is a functional dependent relationship among a defined subgroup of telephone devices, which enables the client/user to maneuver between the multiple phone/devices within the defined subgroup of telephone devices at any time before, during, or after a call.

In accordance with an aspect of the invention, the increasing availability of a person or a group and reduction in calling numbers can be achieved simultaneously by providing all devices within a defined subgroup of inter-dependent telephone devices with the same telephone number. This results in at least two of the multiple devices having one and only one identical active calling numbers. Further, one of the multiple devices having identical calling numbers is capable of being placed on activated mode while the other multiple devices having identical calling numbers are placed on stand-by mode and are not considered to be in active mode. A phone in active mode may make or receive calls. A phone in standby mode cannot make or receive calls. Only one phone shall be in active mode at any given time, with the exception of executing the switch to make a phone previously in standby mode the newly active mode phone among the inter-dependent subgroup of phone devices.

In accordance with a further aspect of the invention, the device that is activated will alert a user of an incoming call with a first ringtone assigned by the user. The stand-by devices will alert the users of an incoming call, but that stand-by device is on "stand-by" with a second ringtone, different from the first ringtone, assigned by the users.

In accordance with a yet further aspect of the invention, it is possible, at any time prior to making an outgoing call (prior to dialing the digits of the target phone number) or answering an incoming call (up until the time of connection, which includes while the phone is ringing) or after disconnecting from a placed outgoing call or incoming call, to switch which of the multiple devices within the subgroup of inter-dependent telephone devices is to be the phone in active mode. This is done by entering a code into a device or through a switch means or Personal Identification Number (PIN). Accordingly, it is possible to have on-the-fly redirection during the connected call session of an incoming or outgoing call, resulting in the telephone device that was formerly on stand-by becoming activated in order to allow the user to answer the call. This will also result in the formerly activated device being placed on stand-by mode. In one example, each of the telephones may have the same calling number.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE DRAWINGS

Figure 1A:
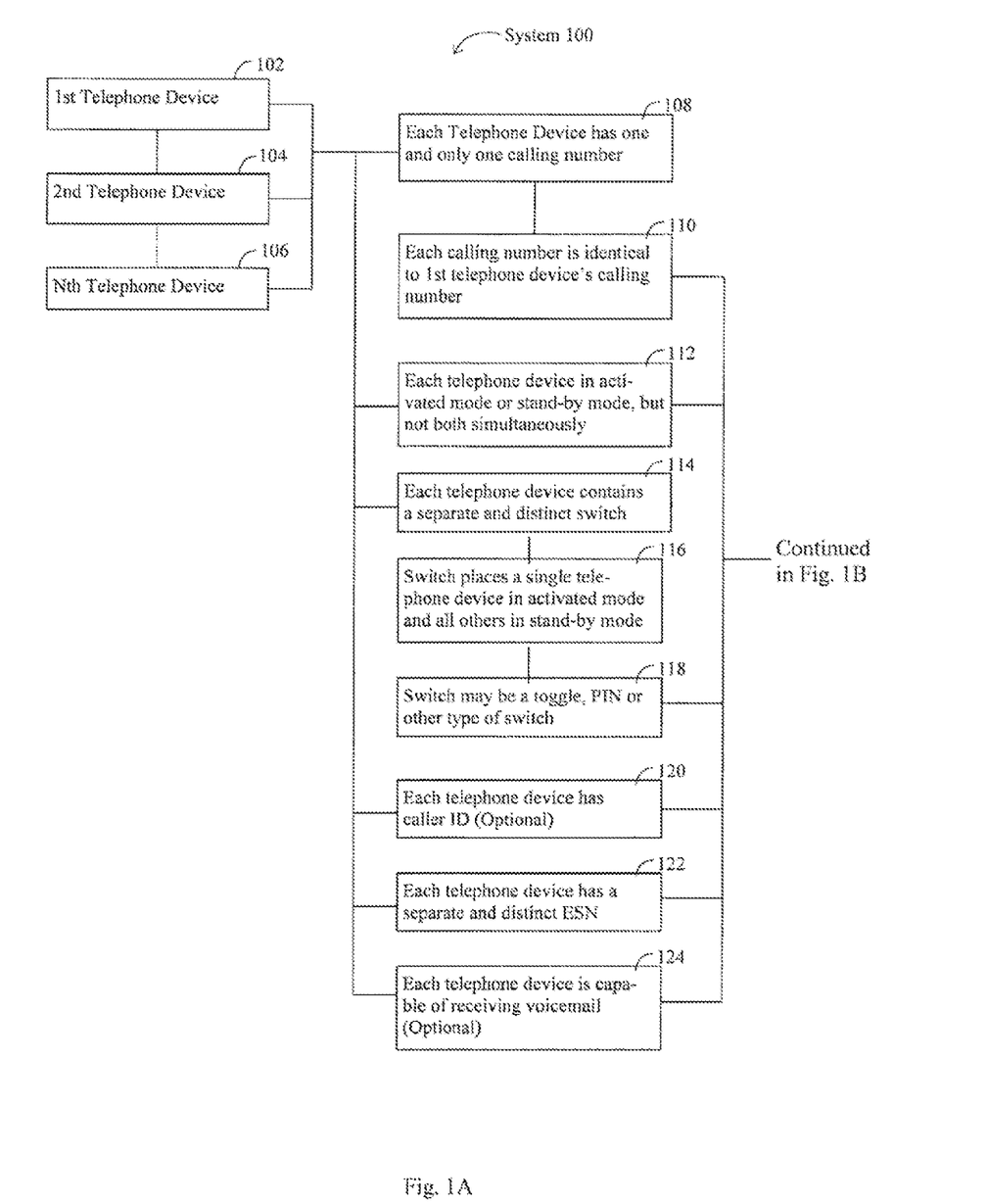
FIGS. 1A and 1B is a flowchart of a telephone communication system embodying principles of the present invention.
Figure 1B:
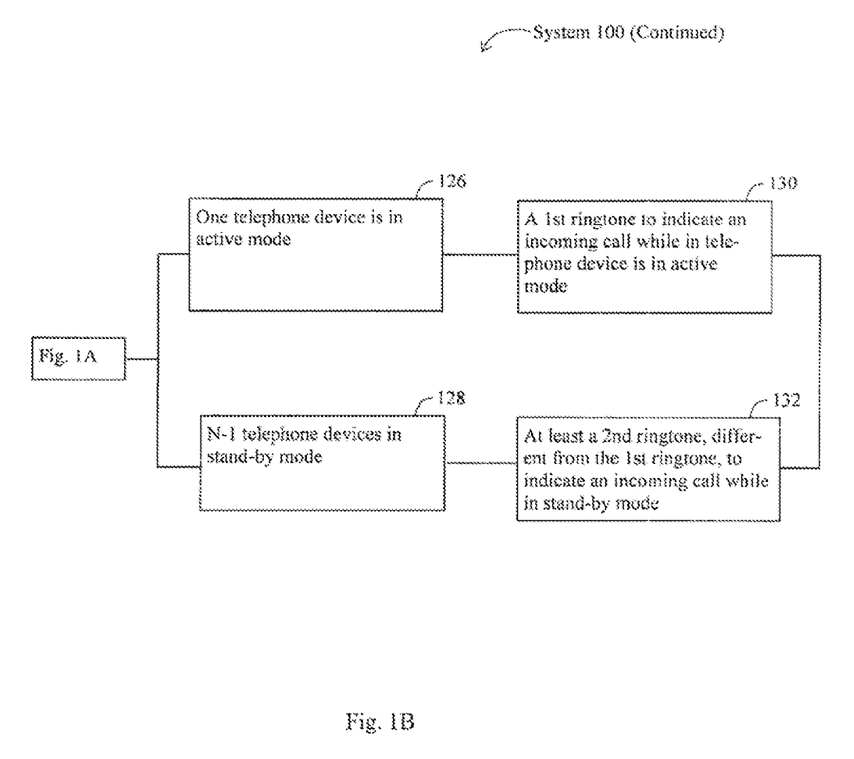

Referring now to the Figures, a telephone communication system 100 in accordance with one embodiment of the invention is depicted in FIG. 1. In one aspect, a first telephone 102 capable of being placed in both active and stand-by mode, but not both modes simultaneously 112 and having one and only one active calling number 108 is provided. In addition, a second telephone 104 capable of being in both active and stand-by mode, but not both modes simultaneously 112 and having one and only one active calling number 108 is provided. The one and only one active calling number 108 of the second telephone 104 is identical 110 to the one and only one designated calling number 110 of the first telephone 102. Thus, each telephone is capable of receiving calls pertaining to one and only one calling number at a time. In one embodiment of the invention, a phone may have multiple calling numbers associated with it (e.g., where a phone is equipped with multiple SIM cards at one time), however, under at least one embodiment of the present invention, only one of such calling numbers may be active or operational at any given time (i.e., there is "one and only one active calling number" per telephone device). Thus, while a phone may be equipped to make calls from multiple calling numbers, only one of such calling numbers may be operational at a given time and thus even such phone (i.e., one having multiple SIM cards) has one and only one active calling number.

It is possible to have N telephone devices 106 in the system 100, where N is 2 or greater. Each of the N telephones are capable of being in active and stand-by mode, but not in the same mode simultaneously 106. In an embodiment of the invention all N telephones in the system must have individual calling numbers 108 and all of the individual calling numbers must be identical 110. Each of the N telephone devices 106 can be any of a landline telephone, cellular telephone, SIM card placed in a cellular telephone, satellite telephone, computer, car telephone, etc. and equivalents thereof. Of the N telephone devices 106 in the system one phone will be activated 126 and N−1 telephone devices will be on stand-by 128. All N telephone devices 106 may receive caller identification (ID) on each call 120 (telephone device permitting), whether or not the telephone device is activated or on stand-by.

Each telephone device 106 contains a separate and distinct switch 114. This switch 114 is capable of activating the telephone device it is associated with 126, which results in placing all other system telephone devices 128 in stand-by mode 116. In another embodiment the switch 114 may be capable of placing the activated phone in stand-by mode and one of the phones previously in stand-by mode in activated mode. In yet another embodiment, each device 106 may have two switches, one for placing a phone on activated mode while in stand-by mode and one for placing a phone in stand-by mode when in activated mode. Further, one switch 114 may be capable of placing a phone in activated mode while in stand-by mode and placing a stand-by phone in activated mode. A device 106 in stand-by mode 128 is not capable of making outgoing calls or answering incoming calls without being switched to activated mode 126. The switch located on each of the N telephone devices 106 in the system 100 can be of numerous types, including, but not limited to a toggle switch, a Personal Identification Number (PIN), and/or a menu-type switch listing all phones associated with the one and only one identical calling number. If a PIN is used, it may be the same for each of the N telephone devices 106, voice activated switch, or other switch capable of activating one telephone device and placing the rest on stand-by and equivalents thereof 118. The user may assign a ringtone that indicates the phone is activated and that there is an incoming call 130. Also, the user may assign a ringtone to all N telephone devices 106 in the system 100 that indicates the telephone device is in stand-by mode and that there is an incoming call 132, this ringtone is different and distinct from the ringtone indicating the telephone is activated and there is an incoming call.

A telephone device 106 of the system 100 may be switched from being in stand-by mode to active mode at any time 112.

This includes the feature that a telephone device 106 of the system 100 may be switched from stand-by to activated mode while there is an incoming call, during a call, before and after a call or any time occurrence possible in regard to an incoming or outgoing call. When switching of modes occurs during an incoming call it is referred to as "on-the-fly redirection". Any switching of a device 106 from stand-by mode to activated mode or from activated mode to stand-by mode occurs in near real-time. However, it is contemplated that up to two telephone devices 106 may be activated at the same time momentarily so as to facilitate switching a call from a previously activated telephone device 106 to a newly activated telephone device 106. In the event two telephone devices 106 are active at the same time, it is an aspect of the invention to minimize such time two telephone devices 106 are active at the same time.

A further aspect of the invention includes how the on-the-fly-redirect function is performed. Once a user presses a switch to turn a telephone device 106 from stand-by 128 to active mode 126 the telephone device 106 sends a signal to a mobile switching device located at a communication service provider location. A communication service provider is defined as an entity that provides communication services in addition to or other than only communication hardware. The mobile switching device then sends a signal to the previously activated telephone device 106 and places it in stand-by mode 128. In another aspect, the switch on an activated 126 telephone may be pressed, causing another phone to be activated 126 and the previously activated phone to be turned to stand-by mode 128. The switching of which phone 106 is activated 126 results in the call being transferred to the newly activated phone. The call may be transferred to the newly activated phone in one of at least two ways. First, the mobile switching device may place the call on hold and then turn the previously activated telephone device to stand-by and then transfer the call to the newly activated telephone device. Second, the mobile switching device may transfer the call to the newly activated phone while both phones are activated and then the mobile switching device will send a signal to the previously active phone to place it in stand-by mode. Any and all switching occurs nearly simultaneously and therefore, privacy is maintained with either switching method. In addition, switching which telephone device 106 is in active mode 126 may occur as many times as the user deems necessary, no matter if the switching occurs before, during or after a call.

As is required by law each individual telephone device 106 has a distinct Electronic Serial Number (ESN) 122. This will allow for separate billing of each individual telephone device 106 of the system 100, although all telephone devices 106 in the system 100 have the same identical calling number 110. A billing database may be used to track the usage and charges for each telephone device or any associated calling number.

Further, each of the N telephone devices 106 may be capable of receiving voicemail 124, but a caller may leave a message only on the activated telephone device. This is beneficial because it will allow a user to determine at which of the N telephone devices 106 the incoming caller should leave a message. In another embodiment of the invention, it is contemplated that one voicemail, possibly a corporate voicemail, will be assigned to the identical calling number and may be accessed by any and all N devices 106.

Yet further, each of the N telephone devices 106 may be capable of making outgoing telephone calls when in activated mode. Each of the outgoing telephone calls from any of the N telephone devices 106 will originate from the identical calling number 110 assigned to said N telephone devices 106.

Figure 2A:
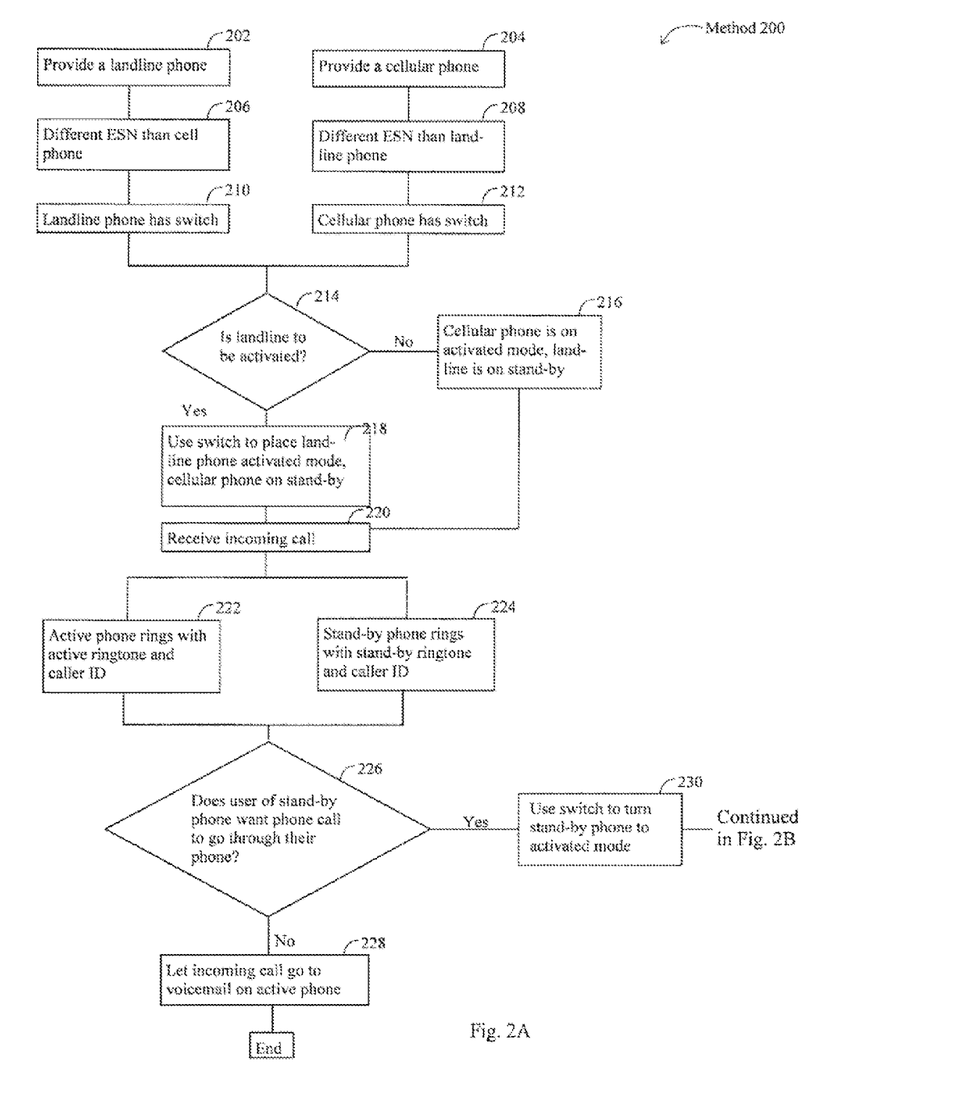
FIGS. 2A and 2B is a flowchart of a method of using a telephone communications system embodying principles of the present invention.
Figure 2B:
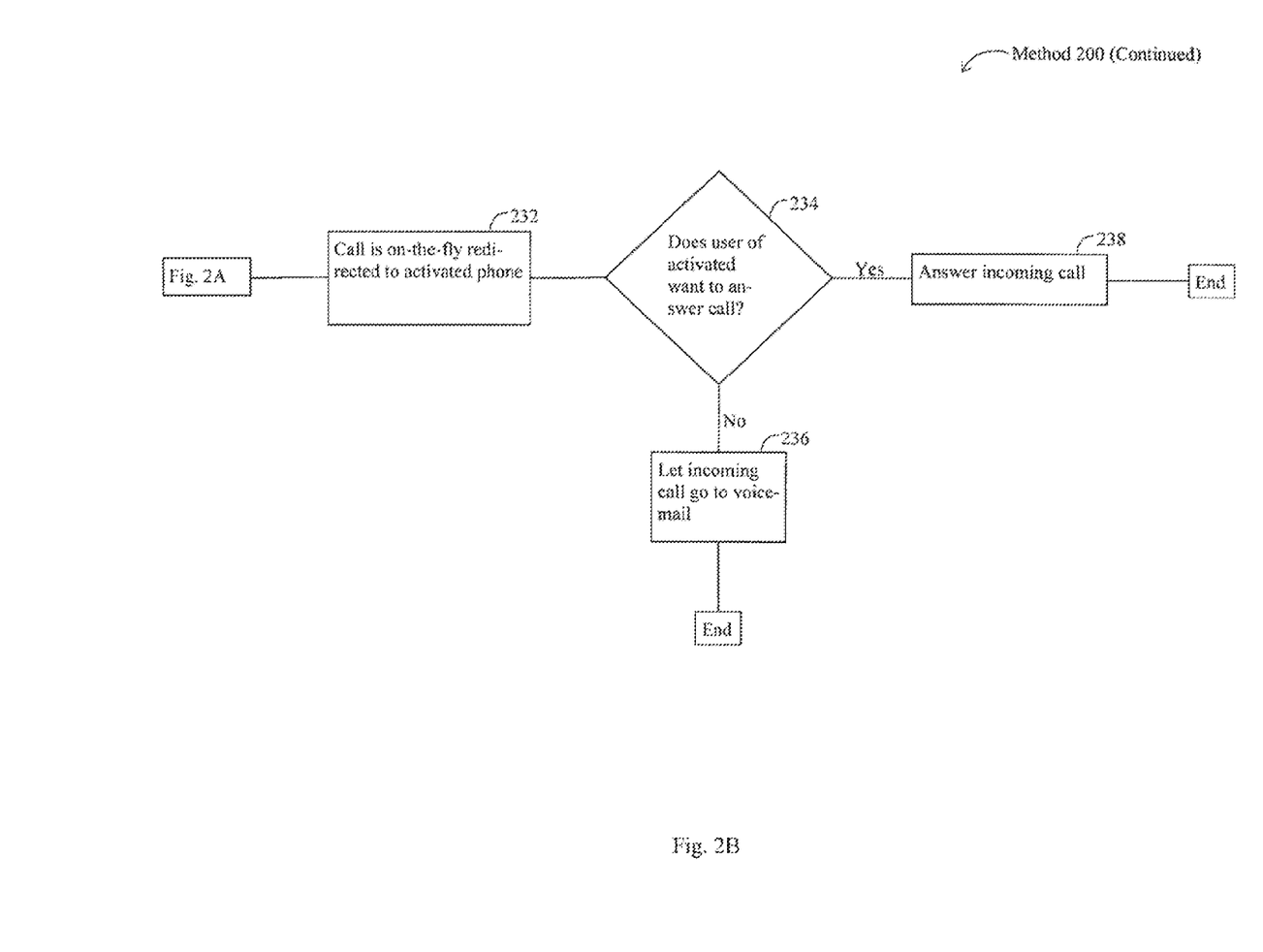

The use of this telephone communication system 100 can be described through an example 200 shown in FIG. 2. This example 200 is only a single aspect of a single embodiment of the invention. A user may have a landline telephone 202 and a cellular telephone 204. Both the landline telephone 202 and the cellular telephone 204 have the same identical 10-digit calling number. In another aspect of the invention, the landline telephone 202 and the cellular telephone 204 may have separate and distinct 10-digit calling numbers. Each of the telephone devices 202, 204 have separate and distinct ESNs 206, 208. In addition, both the landline 202 and cellular telephones 204 are associated with a switch 210, 212 that is capable of activating the respective phone and turning the other phone to stand-by. Either the landline telephone 202, 218 or the cellular telephone 204, 216 is required to be on activated mode 214. In this example, the switch is activated by entering a four-digit PIN (can be the same PIN or different PIN for each phone).

An incoming call is placed to the identical calling number 220. For example purposes, the landline telephone 202 is activated and the cellular telephone 204 is on stand-by 218. However, the user is away from the landline telephone 202 and is unable to hear or answer that telephone, but has the cellular telephone 204 within hearing distance and knows there is an incoming call because the stand-by ring 224 is a separate and distinct ring from the activated ring 222. The user decides 226 to answer the incoming call on the cellular telephone (stand-by phone) 204. User will then use the keypad of the cellular telephone to enter the PIN associated with the cellular telephone in order to activate that phone 230, resulting in the landline phone being placed into stand-by mode. Because of the on-the-fly redirection 232, the user is able to activate the cellular telephone and choose 234 whether to answer the phone call 238 or let it go to voicemail 236. If the user chooses to answer the incoming call, the user answers just as the user would answer any other call 238.

In the above example, if the user were to look at the caller identification on the cellular telephone in stand-by mode 226 and realize that the call should go to voicemail on the landline the user can choose to not answer the incoming call and the landline voicemail will pick up 228. If the user does not want to answer the call after reviewing the caller identification on the cellular telephone 226, 236, but would like the cellular telephone voicemail to pick up the call the user may enter the PIN to activate the cellular telephone 226. Once the PIN is entered the user does not have to answer the call 234 and can let the incoming call go to voicemail on the cellular telephone 236.

Further, it is contemplated that the telephone communication system described above can be used in conjunction with a call forwarding system, of the typical call forwarding-type known in the art or the type considered in the Forte patent. Thus, it is possible to associate another separate and distinct calling number with the identical calling number 110 assigned to the N telephones 106 of the telephone communication system 100 described above to provide a new system. This would allow for maximum availability. For example, if a work cellular telephone was required to have a different calling number than the user's home landline and home cellular telephones' calling number, the combined system would continue to allow for a reduction in the amount of calling numbers in use in the community.

Figure 3:
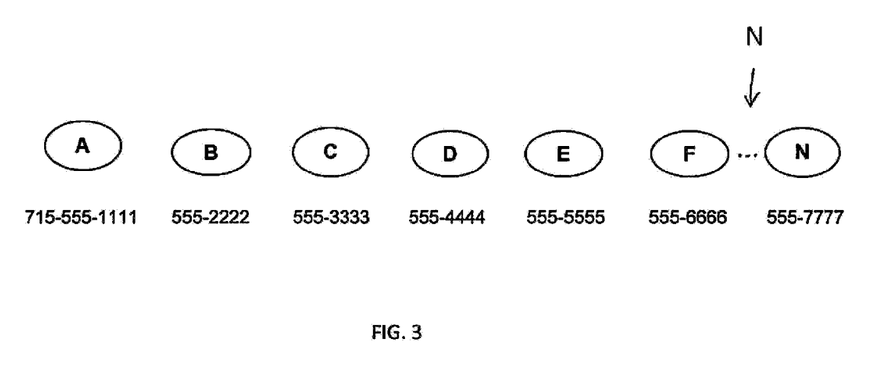
FIG. 3 is a schematic view of a telephone communication system in accordance with a further aspect of the invention.
Figure 4:
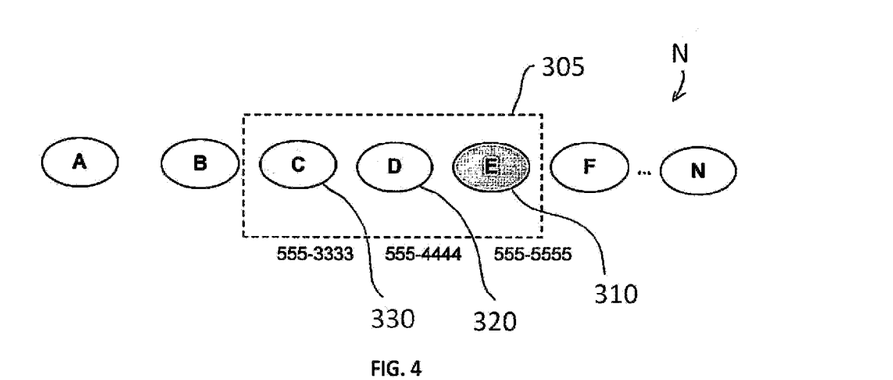
FIG. 4 is a schematic view of a further aspect of the system of FIG. 3.

It may be appreciated that the various N telephones of the present invention need not share an identical calling number. Rather, the active mode and standby mode features of the present invention and system 300 may be achieved with N telephones having a relationship, or dependency, based on something other than a common or identical calling number. With reference to FIG. 3 and FIG. 4, the N telephones may be related or associated as a group 305 by means other than each of the N telephones having an identical calling number. The group dependency or relationship among the N telephones may be designated or established in numerous ways. For instance, all of the N telephones may share a common attribute such as a common billing account, or a common serial number or digital code, or a common geographical position, or a common carrier, or a common private key code. Other non-limiting examples of a common attribute include N telephones grouped together (in a group 305) due to answering of questions in a certain manner (correct, wrong, or based on trends or preferences), based on a lottery, based on color or style, based on a set of selected mobile applications or a single subscribed mobile application, based on random selection, based on a range of percent battery life remaining, or based on any criteria used to designate a group of N telephones as a related group 305. The group or relationship may change over time, with additional telephones joining or leaving the associated group or groups. It may be appreciated that a "common attribute" creating a group dependency may include a common address, such as a common email address and/or a common telephone number.

In one aspect, the group of related N telephones 305 enjoys the benefits of the active mode and standby mode such that when one telephone is in active mode, the remaining N−1 telephones are in standby mode; only the active telephone can make or take calls (a standby telephone cannot make or take calls), a call to a telephone number associated with any of the N telephone in standby mode is redirected to the active mode telephone within the group; and a standby telephone may be switched from standby mode to active mode at any time before, during, or after making or receiving a call. A PIN may be used for privacy protection so as to prevent a hijack attempt, i.e., unauthorized switching of a standby telephone to an active telephone. An authorized switching may occur by entering a PIN at either the activated mode telephone or at any of the N−1 standby telephones as desired. The authorized switching may also be limited among certain of the phones as programmed and as desired.

In one aspect, an incoming call to any of the N telephones within the associated group results in a direct connection to the telephone in active mode. If the dialed number is the number associated with the active mode telephone, the call passes directly to the active mode telephone. If the dialed number is associated with one of the standby telephones of the associated group, the active mode telephone is identified and the call is directed to the active mode telephone. In one example with respect to FIG. 4, if an outside caller dials user standby phone device 555-3333 (instead of the current Active number within the CDE group 555-5555), the system recognizes that 555-3333 is in standby mode and is member of the CDE group and dials the Active number 555-5555. The signal is directed to the Active phone device among the group CDE associated with dialed number 333-3333, which in this example the call is directed to the device associated with active number 555-5555. For an outgoing call, which may only be initiated by the active mode telephone, the call may be redirected to any of the selected standby mode telephones immediately after dialing the final digit of the phone number prior to call connection (i.e., while the line is ringing), and anytime during call connection. For instance, a user may place an outgoing call on a cellular telephone, and upon dialing the last digit of the number, the user may switch the call to a landline home phone (assuming it is associated with the same group as the cellular phone) by switching the standby mode landline phone to active mode and thus resume the call on the home landline telephone. The switching may be initiated at the standby phone or the active phone.

In one non-limiting example, a person or user may own or control a plurality of N telephones. The plurality to N telephones, or a subset of the telephone may comprise a group 305 of telephones. In one aspect each of the N telephones will have a unique calling number. A user may own a personal cell phone (carrier: Verizon) with phone number 715-555-5555 and designated as Active; a home phone (carrier: Charter) with number 715-555-4444 and designated as Standby; and a Work Direct Dial (carrier: ATT) telephone with phone number 715-555-3333 and designated as Standby. It may be appreciated that the respective phones may be associated with different or the same carriers. The three telephones are part of an associated group 305. For instance, the group may comprise phones associated with a common billing account (or some other non-limiting grouping relationship). While in active mode, the cell phone 310 may make or receive calls, while the home phone 320 and work direct dial phone 330 cannot directly make or receive calls because they are each in standby mode. Home phone 320 and direct dial phone 330 are programmed or configured to route and/or re-route incoming calls (and/or software at a switching point is configured to not allow passing of a call directly to home phone 320 or to work direct dial phone 330). The configuration may be altered by a user in designating or switching a standby mode telephone to the active mode telephone.

In one instance, a user carries his or her cell phone 310 and may go to the office or go to work or other location and from a standby work phone 330 (present at work or other location) may switch the work phone 330 to Active mode (for instance by entering a PIN at the standby phone or by other switching method), thus changing the cell phone 310 to standby mode. In this scenario all incoming calls to any of the three listed user telephone numbers (i.e., any of 715-555-5555, 715-555-4444, or 715-555-3333 in the present example) are directed to the work phone 330. Even a call directed to the cell phone 310 is redirected to the work phone 330. If a "personal" call (i.e., a call dialed to the personal cell phone 310 or the home phone 320) comes into the work number or associated work phone 330, the user may choose to take the personal call on the work phone 330 or may decide to execute a redirect (i.e., an on-the-fly redirect") and switch the personal cell phone 310 to Active, thus seamlessly redirecting the call from the work phone 330 to the newly active personal cell phone 310.

In one aspect, work phone 330 is configured with a direct-dial number so that calls from outside the work phone network (i.e. outside the phone system associated with the work phone as part of an internal phone system) may be sent directly to the work phone 330. The work phone 330 and associated work phone system may include internal work extension numbers (i.e., colleagues in the work environment may call respective work phone extension internal to the system). In one aspect only the work direct dial number associated with work phone 330 is associated within the interdependent group 305 of phones N. This allows for internal work extension calls to be received by work phone 330 even though work phone 330 may be designated in standby mode in the associated group 305. This configuration allows a user to receive work direct dial calls on an active cell phone 310 (FIG. 4) while calls to the internal work extension are also allowed to go through to the work phone 330. After taking the personal call on personal cell phone 310, the user may decide to switch the work phone 330 back to active mode (as executed from the then-current "standby" work phone 330). This places the cell phone 310 back in standby mode.

While personal cell phone 310 is in standby mode it cannot place or receive calls. It may be appreciated in one aspect that the system is configured such that text messages may nonetheless be placed and received by personal cell phone 310 even when cell phone 310 is in standby mode.

In a situation where a person loses his or her cell phone which happens to be in active mode, i.e., phone 310, such phone may be switched to standby as described herein. This may be accomplished by making one of the other phones (i.e., phone 320, 330, etc.) the active phone of the associated group. This further reduces the opportunity of a person making unauthorized phone calls on a lost/found device. In such case the now-standby phone may still be able to utilize text messaging until deactivated by the telecommunications provider. In other aspects the system may be configured to also preclude text messaging upon being placed in standby mode.

In a further example a situation may arise where a new hire is employed and brings his or her own cell phone to work. The employer may assign a direct dial work number for the new employee. This direct dial number may be associated within a new employee group of inter-dependent phone numbers, allowing the employee to utilize one phone device for personal and work related activities. The employee selects the direct dial work number to be Active Mode when performing work duties and personal number as Active during personal time. Calls to the direct dial work number (after hours) when the user has the work direct dial number in Standby Mode are directed to the Active Phone device, where the user may choose to take the call or let the call go to a message box. Messaging may be configured to go directly into the message box of the phone in Active Mode or to the message box associated with the dialed number (in this case the direct dialed work number). When the employee leaves the employment of the company, the direct dial number may be removed from the group of inter-dependent numbers for the user. The user takes his or her phone (but not the company number) and moves on to other opportunities.

In a further aspect, the user has concluded a work day or event and is returning home or departing from work or otherwise ending a work function. The user may wish to place his or her personal cell phone 310 in active mode. The user enters a PIN (or uses some other type of switching aspect) into the then-current standby personal cell phone 310 to place it into active mode, thus placing the work direct dial phone 330 into standby mode. Any call directed to the work direct dial phone number (and also any call directed to the other phones of the associated group such as the home phone 320) are directed to the personal cell phone 310 (active mode). The user may arrive at home, for instance, and may wish to place the home phone 320 in active mode (by entering a PIN, for instance, at the home phone 320, thus switching the personal cell phone into standby mode.

If an after-hours business call is placed to the user's work phone 330 (in standby mode), the call is re-directed to the active mode phone, which in the present example is the home phone 320. The user may rely upon caller ID to determine whether to take the incoming call or allow the call to pass to phone mail. In one aspect the phone mail message would be stored or associated with the active mode telephone. In other aspects the phone mail message may be linked or associated with any of the phone in the associated group 305. The system may also be configured such that deletion of the phone message from any of the phones of the associated group will delete the message in general. It may be appreciated that the system is configured such that caller ID information may be displayed at each of the telephones of the associated group. The system may also be configured such that the caller ID information is displayed or accessible from only certain of the telephones of the associated group as selected.

In a further aspect, a user may wish to place a telephone call. The user would like to place the call on his or her home phone 320. The user may wish to avoid incurring charges on the cellphone 310, or prefers the comfort of the home phone 320, or for other reasons. In some cases the user will not remember the calling number to be dialed, and the calling number is not stored or readily accessible at or from the home phone 320. Under the present system, the user may activate the then-current standby cellular telephone 310 (i.e., by switching it from standby mode), which places the home phone 320 in standby mode, and then look-up or retrieve the desired phone number from the list of contacts (or from recently dialed information) displayed on the cell phone 310. The user initiates the call from the personal cell phone 310, and then while the call is being placed (ringing) or after connection is made (the called party answers or picks up the call) the user places the home phone 320 into active mode (from the then-current standby home phone 320). In such manner the user may enjoy and continue the conversation with the dialed party from the home telephone 320.

It may be appreciated that the telephones comprising the plurality N of phones or the group of phones 305 may include cellular telephones, land-line phones, satellite phones, Voice-Over-Internet-Protocol (VOIP), and other types or varieties of phones or audio communication devices having mobile application software programs (i.e., an "App") stored on or used in association with telephone or communication devices. It may also be appreciated that each of the phones may be the same, and each phone may be a cellular phone.

In a further aspect, the billing arrangement for placed or received calls is configured so that billing is made to the then-active mode telephone for the duration the active telephone is connected on the call. If a user redirects the call to a second phone (such as with "on-the-fly-redirect"), the billing against the first phone ends when the second phone is made the active mode telephone within the associated group of inter-dependent phones.

In a further aspect, the caller ID information displayed or received at a receiver's phone is the phone number associated with the active phone number at call connection. The system may be configured such that if and when the user switches phones during the conversation (making a standby phone active), then the newly active phone number may be recorded into the record of recently received calls within or associated with the receiver's telephone.

It may be appreciated that use of a "Star 69" or *69 key function will allow a user of a phone to ascertain the calling number and other caller ID information of a recently received call. Typically the *69 function will display caller ID information associated with the most recent call received by a telephone (i.e., press *69 at the telephone reveals the most recent call information). This information may be viewed, for instance, at a person's home phone 320. In one aspect, and in the event of the caller using "on-the-fly-redirect" during the course of the call, the call recipient at his or her home phone 320 may enter *69 upon disconnection of the call and will receive the caller ID information of the caller's active phone at the time the call was disconnected.

A caller attempting to contact a person may call one of several telephone numbers associated with the called person (i.e., call their home phone number, cell number, work number, etc.). A caller may not know each of those calling numbers. It may be appreciated that under the present system, calling any of the number associated with the called person may nonetheless result in a call connection because dialing any of the numbers will lead to the call being received at the phone associated with the then-active phone and/or calling number. In this manner when a person changed telephone numbers the related association may be more readily learned by callers or having to learn all the different and changing numbers becomes unnecessary or irrelevant.

A user may travel with a single cell phone and enjoy access from all other associated phones of the group by utilizing the present system. The associated phones having only one active calling number results in calls to any of the phone in the group to be directed to the active cellular telephone 310 where the user may choose to take the call based on caller ID information or let the call go to phone mail.

Each of the telephones of the group 305 includes a common association or feature. The interdependent group 305 may also comprise telephone numbers which are in turn associated with telephones. In one aspect the telephone numbers are associated with individual SIM cards (or other identification media) such that the card and associated number may be installed or input into different physical telephone devices N. In one aspect, the telephone numbers (and or telephones) which comprise the inter-dependent group 305 can be entered into an associated telecommunications database or system via software such as a mobile software application (APP). Each telephone may store a downloaded APP used for entry of data for being associated with group 305.

In one aspect, adding a phone device into the group 305 requires entry into the group 305 from each of the individual telephone devices. Requiring entry at each of the individual telephone devices protects against a person entering a third person's phone number into the associated group 305 to hijack operations of incoming and outgoing calls from the third person's phone. For instance, were a member of the group 305 (such as phone 330) allowed to switch a phone into active/stand-by mode (i.e., switch a phone such as phone "F"), such user of phone 330 would potentially be able to kidnap an unsuspecting number (associated with phone F) into the group 305. Where once this unsuspecting phone number is listed within the group 305, the phone "F" would essentially be locked into standby mode because the true owner of phone "F" would not know the PIN to make the phone the active phone within group 305. Because a person does not possess the standby phone in which to enter the PIN, the phone number cannot be made or listed as "active" within the group 305 of phones. If there is a phone number entered into the group (i.e., into a database associated with or defining the group 305), there may arise a situation where the number is permanently "locked" in standby mode. One aspect to address this situation includes use of a verification and validation process in which a phone number may only be included into the group 305 via each of the phones to be included in the group 305 by entry of an interdependent group number and the PIN. The interdependent group number may be communicated to the respective users of the phones for invitation or otherwise to enter into the group.

The foregoing demonstrates the active vs standby features may be created by a group of phones that do not share the same identical calling number. Of course, the group relationship or association may be created by telephones that do share an identical calling number.

Figure 5:
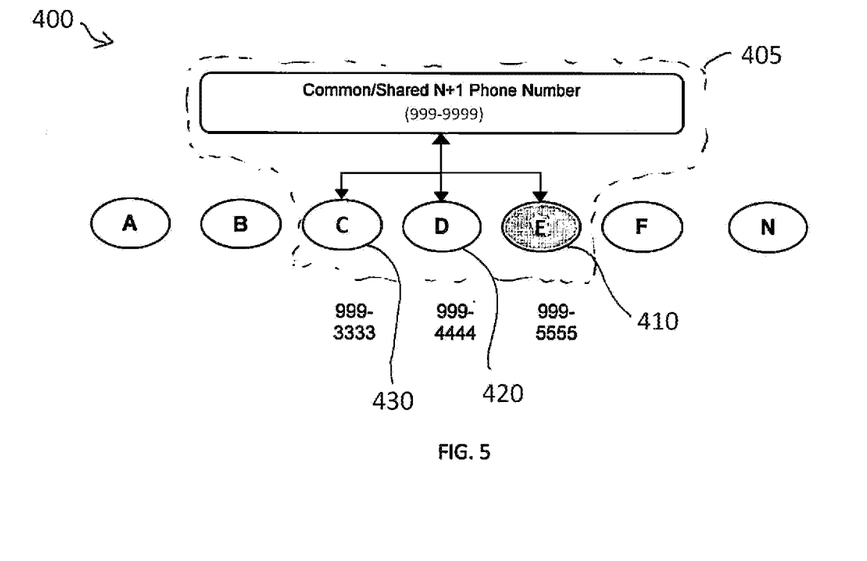
FIG. 5 is a schematic view of a telephone communication system in accordance with a further aspect of the invention.

In a further aspect, a system of N phones or devices may include N telephones each with their own unique calling number, and in turn each of the phones is linked to an additionally unique calling number (N+1) that is shared among the group 405 (See FIG. 5). In this scenario one and only one of the N phone devices is in active mode at any given time and the remaining N-1 devices are in standby mode (there is one aspect where more than one device may be in "active" mode during a momentary switching or hand-off occurrence). All incoming and outgoing calls are process through the common shared (N+1) phone number. Any calls to the individual phone device numbers of the group 405 are processed through the common/shared number (N+1).

Incoming calls made directly to any of the unique phone number devices (which may be in active or standby mode) is first directed through the common/shared (N+1) phone number and then directed to the active mode phone device within the group 405. Outgoing calls may only be executed through the phone device in active mode. A standby phone device, such as device 420 may be switched from standby mode to active mode at any time before, during or after making or receiving a call at standby phone 420 or by active phone 410. This operation is different compared to other phone systems in that some prior systems pertain only to incoming calls. Furthermore, direct dial to any of the unique devices is allowed around the operation of the common number. Such prior systems allow for more than one active device within the system of devices. The present system is designed such that all incoming calls dialed to the unique numbers of phones within the group are processed through the (N+1) active number. In addition, the present system is designed such that all outgoing calls are processed through the active (N+1) number and only one phone is Active while the remaining N-1 phone devices are standby.

In one example with respect to FIG. 5, if an outside caller dials user phone device 999-3333 (instead of common/shared number 999-9999), system 400 recognizes that 999-3333 is associated with common/shared number 999-9999 and dials the common shared number 999-9999. The signal is directed to the active phone device among the group 405 associated with common/shared number 999-9999, which in this example the call is directed to the device 410 of active number 999-5555.

In a further example with respect to FIG. 5, a user dials a number from phone device in active mode (999-5555). System 400 recognizes that 999-5555 is associated with common/shared number 999-9999 and sends the call signal with the caller ID or other identity associated with common/shared number 999-9999.

Figure 6:
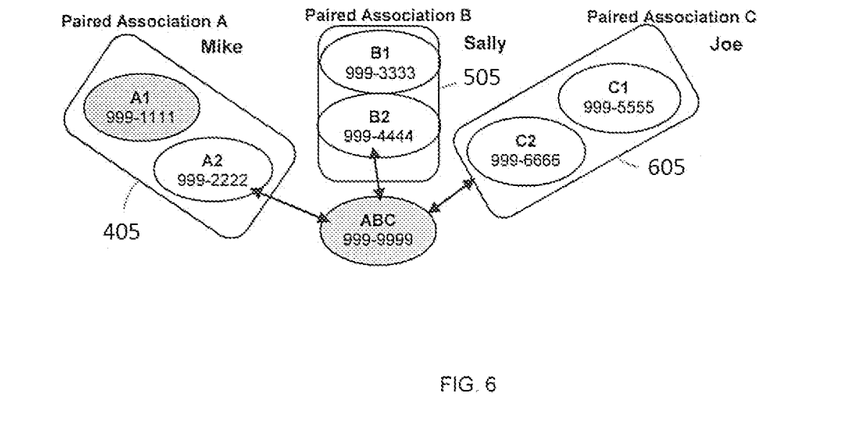
FIG. 6 is a schematic view of a telephone communication system in accordance with a further aspect of the invention.

In a further aspect with respect to FIG. 6, a group of paired associations are linked together with a common phone device/number. The common device/number could be a dummy number to link all of the phone numbers to a common number or could be an actual phone device and number that can make or take calls. In this aspect, each of the three Paired Associations or groups, i.e., group 405 (associated with Mike), group 505 (associated with Sally) and group 605 (associated with Joe), for instance, have N telephones/numbers (where the number of phones may vary between paired association groups), of which one phone device/phone number is shared/common to all three paired associations. For instance, phone device ABC (having number 999-9999) is a common phone device that is shared among the various groups 405, 505, 605. Phone ABC may be in active or stand-by mode. Each paired association has one Active and N-1 phones/phone numbers in Standby Mode. Group 505 for Sally, for instance, may include standby mode device B1 and B2. The shared/common number may be simultaneously chosen to be the One Active phone within multiple paired associations. Calls made directly to any unique calling number in standby mode within the paired associations are connected to the Active number within the paired association. An incoming call made to the shared/common number requires a system prompt to identify which paired association (i.e., group 405,

505, 605; or name, Mike, Sally, Joe) to which to direct the signal. It may be appreciated that the system illustrated in FIG. 5 with Common/Shared (N+1) Number is different compared to the system in FIG. 6 where all incoming calls and outgoing calls are not processed through the common/shared phone device/phone number ABC. It may be appreciated that in some aspects the system of FIG. 6 may be configured such that any one of the stand-by phones may be switched to active mode as desired, such that the switched phone (i.e., phone A1, for instance) may be activated. The activated phone A1 may be active for only group 405. In a further aspect, the activated phone A1 may also be a defined phone device/number within each of the three paired associations (i.e., such as phone ABC). At any given time, zero, one, two or all three (or more) paired associations may have the shared phone (ABC, or alternatively phone A1 if similarly configured) identified to the one active phone within their given paired association, with all remaining phones within each paired association set to standby mode.

In one aspect, an incoming call with respect to FIG. 6 may be made to any of the phone numbers within the system of paired associations (groups 405, 505, 605) resulting in a direct connection to the phone number identified to be in active mode via the primary phone number. A direct call to the common/shared number may require a "phone prompt" to direct the call to the appropriate paired association or group. For instance, the system may be configured to ascertain whether the dialed number is the shared/common number (i.e., 999-9999) and if so, a phone prompt may ask the caller "to whom would you like to connect?", for instance. For Mike, press 1, Sally, press 2, Joe press 3, etc. The caller answers by voice name or enters a keypad digit. The system identifies the appropriate paired association or group and the primary number. The system connects the call to the active phone within the paired association or group. If the initial call is not made to the shared/common number, the system may identify the primary number associated with the dialed number and connect the call to the active phone within the paired association.

In a further aspect with respect to FIG. 6, outgoing calls may only be initiated from a phone in active mode within a paired association or group. Such call, however, may be redirected to a standby phone within the paired association (after dialing the final digit of the calling number). A person receiving the call will see, for instance, "Primary Phone Number" as referenced in the caller ID. For instance, a user dials a number form an active phone. The system identifies the "primary number" associated with the active phone. The call is connected and billed against the active phone number. The "primary phone number" is displayed as the caller ID on the receiving phone.

In one aspect it is possible, at any time prior to making an outgoing call within a paired association (prior to dialing the digits of the target phone number) or answering an incoming call on a phone within a paired association (up until the time of connection, which includes while the phone is ringing) or after disconnecting from a placed outgoing call or incoming call, to change which of the multiple devices within the paired association of inter-dependent telephone devices is activated and which of the phones are on stand-by. This is done by entering a code into a device or through a switch means or Personal Identification Number (PIN). Accordingly, it is possible to have on-the-fly redirection between phones within a paired association during the connected call session of an incoming or outgoing call, resulting in the telephone device that was formerly on stand-by becoming activated in order to allow the user to take the call on the user defined desired phone. This will also result in the formerly activated device being placed on stand-by mode.

In one aspect, the audio communication through a phone device may be processed through a software application program on the cell phone, i.e., via a mobile software application (an "App") such as through or with Facetime™ or Facebook™. It should be appreciated that this software application program technology, as well as VOIP, is a means to expand the audio communication access at reduced cost. For example, in current technology with an Apple® Facetime application, all Apple smart phones are equipped with the Apple Facetime Application. When a phone number is identified to have access to Apple Facetime Application, a Facetime icon appears within the options to contact the user of the phone number. In one example a user has her home phone in active mode and her cell phone to be currently in standby mode. The caller wishes to utilize Facetime to make audio connection. The user enters a PIN to activate her cell phone as the active phone within the group of phones and then choose to utilize the Facetime Application program to make the audio call. In a further example, the user may choose to utilize Facebook audio communication. Facebook is web based and accessible on a computer, and also comes in the form of a Software Application Program accessible on a smartphone. Like Facetime, Facebook communication requires both parties (the calling and the called phones) to have access to the Application (or the App loaded on each phone). Facebook utilizes a user's email address to define each specific user, with a type of VOIP to connect the two parties with an audio session. In both examples, it can be appreciated that the first level of connection is the phone device, and the second is the application within the device.

It may be appreciated that a telephone or phone for use herein may include a device having an "address" (such as an email address and/or IP (internet protocol) address and/or a telephone number or other electronic address/identification designator). It may also be appreciated that a telephone or phone for use herein may also include a device having an "address" and a mobile application (i.e., App) program. While such a phone may be understood as a traditional cellular telephone and/or a traditional smart phone, it is contemplated that such phone need not be limited to a traditional cellular telephone and/or a traditional smart phone. Other electronic devices having an address and an App may comprise toys or tools or vehicles or other communication devices (or products equipped with communication devices) which may be utilized in the present system and invention.

It may be appreciated that the switch associated with the systems may comprise command logic residing in and/or embodied in and/or implemented in hardware, software, firmware or any combination thereof. In one aspect, the systems of the present application may include a controller which may include a computer chip or circuitry configured to control the electrical operation of the system and associated phone devices 102, 104, including application software programs stored on or used in association with telephone devices. An application software program stored or used with telephone 102, 104 may also be used to control the operations of system. In other examples, various aspects of the techniques may be implemented within one or more processors, including one or more microprocessors, DSPs, ASICs, FPGAs, or any other equivalent integrated or discrete logic circuitry, as well as any combinations of such components. Such hardware, software, firmware may be implemented within the same device or within separate devices (or computer servers) to support the various operations and functions described in this disclosure. When implemented in software, the functionality ascribed to the systems, devices and techniques described in this disclosure may be embodied as instructions on one or more non-transitory computer-readable medium such as RAM, ROM, NVRAM, EEPROM, FLASH memory, magnetic data storage media, optical data storage media, or the like. The instructions may be executed to support one or more aspects of the functionality described in this disclosure. Information pertaining to phone devices and telephone numbers and commands may reside in databases and utilized by processing equipment for operation of the systems.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular TELEPHONE COMMUNICATION SYSTEM AND METHOD OF USING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A telephone communication system comprising:
    a group of N telephones where N is at least two, each of said N telephones configured to be placed in activated mode and alternatively in stand-by mode such that in stand-by mode a telephone is incapable of placing or receiving a call unless switched to active mode;
    each of said N telephones associated with a switch;
    said switch configured to activate one of said N telephones to be an active mode telephone such that all remaining N-1 telephones are on standby mode prior to making an outgoing call or taking an incoming call; and
    at least one of said standby telephones configured such that it may be switched to active mode during a telephone call.

2. The system of claim 1 where at least one of said N telephone is a cellular telephone.

3. The system of claim 1 where each of said N telephones is configured to indicate an incoming call whether in activated mode or in stand-by mode.

4. The system of claim 3, further comprising the indicator of an incoming call to a telephone in active mode is different and distinct from the indication of an incoming call to a telephone in standby mode.

5. The system of claim 1 where said switch is associated with a user matrix within a computer database.

6. The system of claim 1 where each of said telephones of said group includes a common attribute.

7. The system of claim 6 where the common attribute includes an identical calling number.

8. The system of claim 6 where the common attribute includes an association established via a mobile software application program.

9. The system of claim 6 where only one of said at least two telephones may be in active mode.

10. The system of claim 1 configured such that upon entry of a personal identification number, said at least one standby telephone is switched to active mode at any time before, during or after a telephone call.

11. The system of claim 1 where said at least two telephones are configured to be at least momentarily simultaneously in active mode during a switch of a call.

12. The system of claim 1 where said switch is a mobile switching device configured to redirect one of an incoming call and current call from a previously activated telephone to a newly activated telephone.

13. The system of claim 12 where said mobile switching device is configured such that it may place the incoming call and current call on hold while redirecting the call from said previously activated telephone to said newly activated telephone and turning said previously activated telephone to stand-by mode.

14. The system of claim 12 where said mobile switching device is configured such that said switching device may redirect the incoming call and current call from said previously activated telephone to said newly activated telephone and after redirecting one of the calls, said mobile switching devices places said previously activated telephone in stand-by mode.

15. A telephone communication system comprising:
    at least two telephones associated as a group where each of said telephones has at least one common attribute other than having an identical calling number, each of said at least two telephones configured to be placed in active mode and alternatively in stand-by mode such that in stand-by mode a telephone is incapable of placing or receiving a call unless switched to active mode and such that in active mode a telephone is the only telephone of said group capable of receiving or placing a call, where only one of said at least two telephones may be in active mode.

16. The system of claim 15 where said at least one common attribute includes association with a single person.

17. The system of claim 15 where said at least one common attribute includes an audio communication address associated with a single person.

18. A telephone system comprising:
    at least two telephones, each of said phones configured to be placed in either active mode or standby mode; and
    a switch operable with a personal identification number associated with at least one of said at least two telephones to switch said at least one of said two telephones between a standby mode and an active mode prior to making an outgoing call or taking an incoming call.

19. The system of claim 18 where said at least two telephones are configured to be at least momentarily simultaneously in active mode during a switch of a call.

20. The system of claim 18 configured such that upon entry of a personal identification number, said at least one standby telephone is switched to active mode at any time before, during or after a telephone call.

21. The system of claim 18 where said at least one standby phone is configured such that it is incapable of receiving a call or making a call while in standby mode.

22. The system of claim 18 where each of said at least two phones includes a unique calling number and each of said at least two phones is associated with a shared calling number such that a call to the shared calling number is received by only one of said at least two phones previously placed in active mode.

23. The system of claim 22 where one of said at least two phones is a stand-by phone and may be switched to active mode after a call has been received or placed by said active mode phone.

24. The system of claim 22 where said at least two phones is associated with a first group, said system further including a second group having at least two phones, each of said phones of said first group and said second group including a unique calling number and each of said phones associated with a shared calling number common to said first and said second group.

25. The system of claim 24 where one of said at least two phones within a said first group is a stand-by phone and may be switched to active mode after a call has been received or placed by said active mode phone of said first group.

26. The system of claim 24 where only one of said at least two telephones within each of said first group and said second group may be in active mode.

27. The system of claim 24 configured such that upon entry of a personal identification number, said at least one standby telephone within same said group as active phone is switched to active mode at any time before, during or after a telephone call.

28. The system of claim 24 where said at least two telephones within a said group are configured to be at least momentarily simultaneously in active mode during a switch of a call.

29. The system of claim 24 where the shared calling number associated with said first group is the same calling number associated with said second group.

* * * * *